Figure 2:
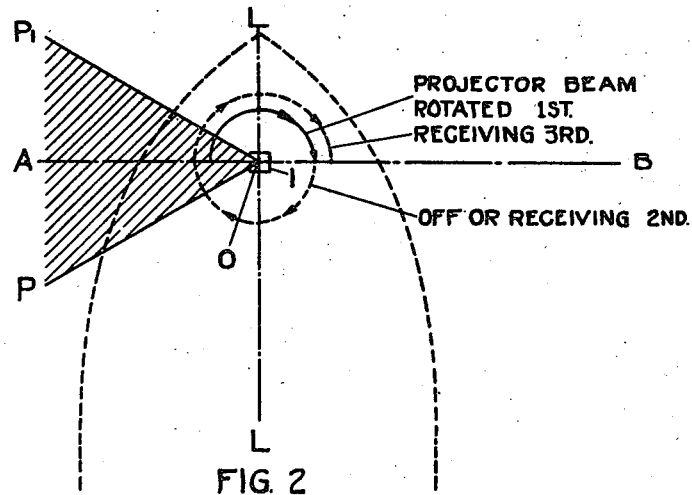

April 25, 1950 — E. W. SMITH — 2,505,587
SOUND RANGING
Filed July 5, 1940 — 2 Sheets-Sheet 1
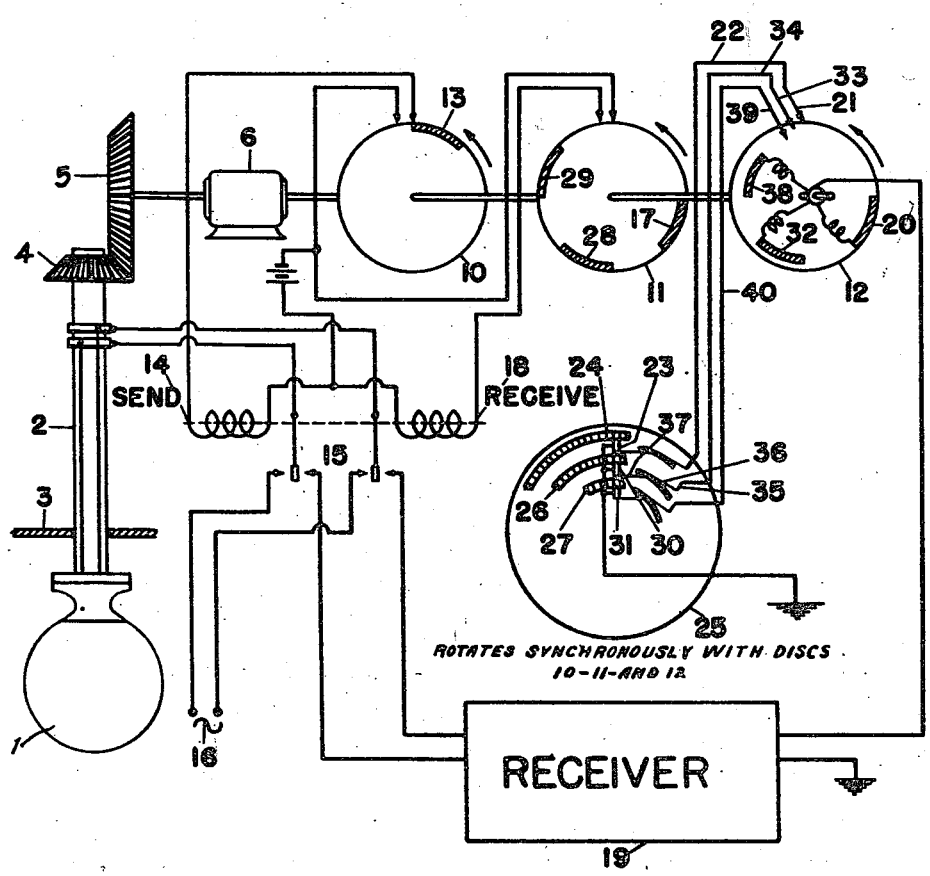
FIG. I
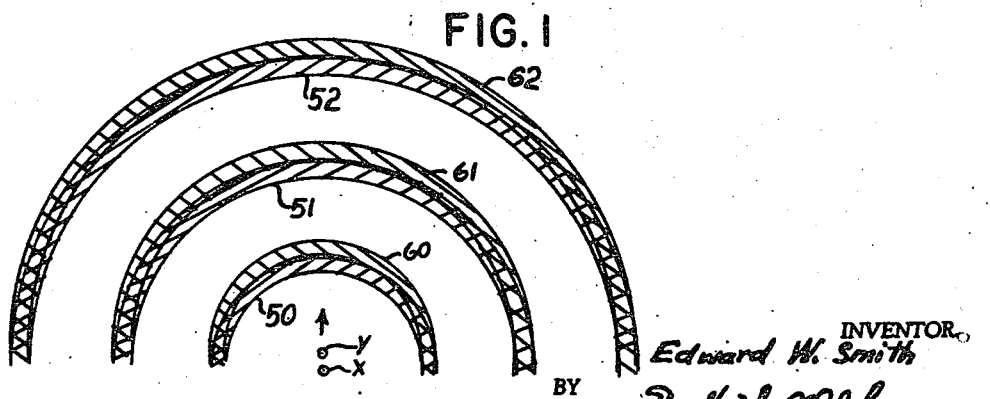
FIG. 4
INVENTOR
Edward W. Smith
BY
ATTORNEY.

April 25, 1950  E. W. SMITH  2,505,587
SOUND RANGING

Filed July 5, 1940  2 Sheets-Sheet 2

EACH ¼' = ½ REVOLUTION OF PROJECTOR.
DISTANCE BETWEEN C AND D DEPENDS UPON
WIDTH OF SOUND BEAM

INVENTOR.
Edward W. Smith
BY Ezekiel Wolf
ATTORNEY.

Patented Apr. 25, 1950

2,505,587

UNITED STATES PATENT OFFICE 2,505,587

SOUND RANGING

Edward W. Smith, Melrose, Mass., assignor, by mesne assignments, to Raytheon Manufacturing Company, a corporation of Delaware Application July 5, 1940, Serial No. 343,977

6 Claims. (Cl. 177—386)

The present invention relates to a sound ranging system and in particular to a system employing a beam of sound or compressional waves for signaling either in air or water medium, and is particularly useful in the detection of obstacles and collision prevention in marine navigation.

The system also has useful application for naval and military purposes in determining the presence in a given range of an enemy craft.

One of the prime objects of the present invention is to give reasonable assurance to the observer on a moving vessel that there are no other vessels within a given distance and within a given angle either side of the bow. In accomplishing this purpose, echo ranging equipment which may already be installed on the ship may advantageously be employed in conjunction with the additional equipment made necessary by the present invention.

Essentially this purpose is accomplished by sending out progressively signals to every bearing within the angle to be searched and arranging the speed of rotation of a constantly revolving directive electroacoustic transducer from which these signals are sent out so that sufficient time would be provided, following the emission of the last signal, to allow for changing over the transducer circuit so that it will be in condition to receive an echo returning back from the minimum distance to be measured by the time the revolving transducer has reached the bearing from which the original signal was sent out.

The return of such an echo may be evidenced by the flashing of a radial neon tube on the periphery of a disc rotating in synchronism with the transducer and the bearing of the object from which it returns will be indicated by the position of the flash relative to a fixed scale.

It follows from the above that the transducer will likewise be progressively in a position to receive echoes from the other bearings toward which signals have previously been progressively sent and these echoes will materialize as flashes of the neon tube providing they return from distances, which, on a time scale, are multiples of the time required for one complete rotation of the transducer.

The range of observation may be extended in bands equally spaced a distance ahead of the vessel, and, by proper choice of the depth of this listening band compared to the speed of the vessel or vessels concerned, the presence of a foreign craft can almost always be detected before the nearest listening band or sector is approached.

In the present system the beam of sound or compressional wave is designed to have a definite angular width. The width of the beam and the speed of rotation of the transducer, for a given allowable speed of the listening vessel and the vessel to be searched or detected, will determine whether the object being located will remain or come within the listening band during one of the periods of search.

Figure 3:
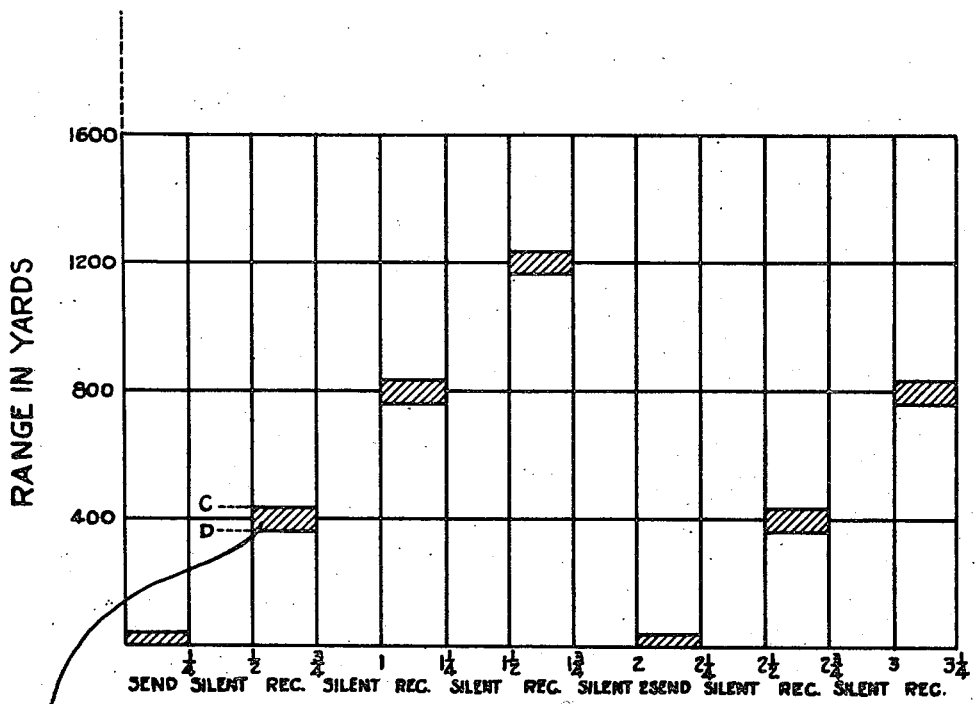

Without further describing the merits and advantages of the present system the invention will now be described in connection with the specification set forth below as illustrated by the attached drawings in which Fig. 1 shows schematically a system in outline; Fig. 2 illustrates a plan view of the vessel with the system as applied; Fig. 3 illustrates diagrammatically the time of listening and receiving periods in relation to the rotation of the projector element; and Fig. 4 illustrates how the area will be searched as the vessel is moving.

The present method may be carried out for submarine sound ranging by means of a directive electroacoustic transducer 1, which may also be termed a combined sound projector and receiver unit, having its diaphragm mounted vertically, which may be rotated, as indicated diagrammatically in Fig. 1, at the end of a shaft 2 which may project or be projected through the skin 3 of the vessel and be turned at its upper end in the vessel by means of a suitable gear drive, as indicated by the gears 4 and 5, which derive their power from a motor 6. The transducer 1 may act both for transmitting and receiving the sound waves in accordance with the program schedule as indicated in Fig. 3. It will be understood that this program may be varied in accordance with certain conditions such as may exist but that in general the arrangement as set forth is generally satisfactory for most listening conditions.

In searching the area forward of the beam of the vessel concerned, the transducer is rotated at a constant speed by motor 6 and gears 4 and 5. When the axis of the transducer, perpendicular to its diaphragm, moves through the port beam position, let us say, the transducer is energized by a voltage obtained from the power source 16 through contacts and cams 13, which energization is continuously applied through the following 180° of rotation of the transducer. The projector, as it rotates through one-half a circle, or more, if desired, in the forward direction from the position A to position B, as seen in Fig. 2, will be sending out the beam of sound or compressional waves of a width as indicated between the lines OP and OP₁. This opening may be of such a substantial width that the depth of observation as indicated in the chart of Fig. 3 between lines C and D will cover a sufficient width for practical purposes. This will be more completely explained later.

In Fig. 3 it has been assumed that the period of rotation of the transducer 1 may be at the rate of one revolution every one-half second, in which case the beam will have covered the forward half sector in a period of one-quarter of a second. The transducer may then be turned off and when it again approaches with its axis in the line OA, as indicated in Fig. 2, the system is changed to receiving, in which case the transducer will receive for the forward half 180° for a period beginning one-half a second later than that at which the sound was first transmitted and extending for an interval of one-quarter of one second. If the velocity of sound in sea water is assumed to be 4800 feet a second, which is approximately correct for most purposes, the transducer at the beginning of its receiving cycle will be receiving echoes reflected from an object 400 yards away. If, now, the angle of opening of the beam between the lines OP and OP₁ is 60°, an object within this angle will receive sound for substantially 60° in the rotation of the beam and will transmit its reflected echo also for a period equal to 60° of the rotation of the transducer. Approximately, therefore, during a period of 60°, or its equivalent, one-twelfth of a second, objects in the vicinity of the 400 yard range will be detectable. This determines the width of the band between the lines C and D in Fig. 3, which in the example given above is approximately 133 yards or 400 feet. The weakness of the echo at the sides of the beam may limit the reception for the longer ranges and make the beam sharper at the greater distances of operation.

In the system as shown in Fig. 3 the receiver may receive for three consecutive revolutions of the transducer in the forward half sector before a second sending impulse is given out. In this case the first receiving revolution will search the 400 yard range, the second receiving revolution the 800 yard range, and the third the 1200 yard range, each ±200 feet.

From the illustration above, it will be noted that each listening range is searched every two seconds in a band equal to 400 feet in depth. This means that any vessel in order to avoid detection would have to cross this 400 foot band in less than two seconds, which means that the relative speed of approach or recession between the two vessels would be at the rate of 200 feet per second, which is much greater than any vessel normally would have. In fact, normally the speed of approach or recession is not more than ¹/₁₀ of this speed so that, if desired, the beam angle may be made quite narrow or if desired the rotation of the beam or the intervals of signaling may be increased so that signals are given more frequently than one in two seconds.

As the searching vessel is advancing it is periodically sending out signals progressively to each of the bearings to be searched and it is periodically and automatically thereafter putting itself in a position to receive progressive echoes returning from these same bearings provided that the echoes return from distances which are multiples, on a time basis, of the time required for one complete revolution of the oscillator. Thus, if the signals are sent out once every five seconds and the transducer is revolving once every half second, the transducer will progressively be in a position to receive echoes from objects on any bearing between 400 and 4000 yards away provided that such objects are located at some multiple of 400 yards away, i. e., 400, 800, 1200, etc. The amount by which the actual distance of the object may differ from 400, 800, 1200 yards, etc. will be determined in the present instance by the width of the transmitted beam.

Since this procedure will be repeated every five seconds, let us say, it means that the whole area forward of the beam of the searching vessel will be searched in 400 feet steps every five seconds. On a ship moving at 15 knots, this means that this procedure is repeated for every 42 yards of travel as the searching ship is moving forward.

In Fig. 4 is illustrated ranging ahead of the vessel. This figure would hold for high vessel speed, say, 30 knots, in which case the vessel would advance the same distance as the depth of search assumed to be in this case 400 feet. In this case the first ranging series are represented by the shaded sweeps 50, 51, 52 corresponding to the vessel's position X. The second ranging series take place when the vessel has advanced to Y, and the second shaded sweeps are indicated at 60, 61 and 62. It will be noted that there is no gap in searched areas; that is, if the vessel continues to advance, the whole forward area will be searched three times by the continuation of sweeps 50—60, 51—61, and 52—62, respectively.

Under the worst conditions, therefore, the object in the path of the searching vessel would have to have its dimensions along the line of travel of the searching ship less than 42 yards to be missed when a very narrow beam is being used. For a wider angle of beam, this distance would be reduced.

The system for carrying out the program set forth in Fig. 3 is illustrated diagrammatically in Fig. 1. Three commutator discs 10, 11 and 12 may be driven synchronously or by the same shaft in the ratio of four revolutions of the transducer 1 to one revolution of the discs 10, 11 and 12. The disc 10 has the sending segment 13 which operates the relay coil 14 for closing the switch 15 to the left or sending position connecting the power source 16 with the transducer 1. The cam 13 is of a sufficient length to produce a signal for 180°. In the next half cycle until the transducer again is in its original position when it began sending, the whole system may be silent. Following this, the cam or contact segment 17 operates to energize the relay coil 18 and throw the switch 15 to the receiving position, in which case the transducer is connected to the receiver 19. Simultaneously with this, the segment 20 on the cam 12 is brought in contact with the brush 21 impressing the output of the receiver through the line 22 on the indicator 23 mounted on the rotating disc 25. Adjacent the indicator 23, which may be of the type shown in the patent to Dorsey No. 1,667,540 of April 24, 1928, in front of the disc are three calibrated scales 24, 26 and 27, scale 24 corresponding to the ranges of 400 yards, and scale 26 to the ranges of 800 yards, and scale 27 to ranges of 1200 yards. Each of these scales 24, 26 and 27 may be calibrated in degrees of bearing corresponding to the position from which the echo is received on the transducer 1. The disc 25 will therefore rotate one revolution for each half revolution of the transducer 1. The speed may be controlled by any desired method, as, for example, by a gear drive or by synchronous motor means.

On the cam 11 there are provided three sectors 17, 28 and 29. Sector 28 corresponds to the second listening interval as indicated in Fig. 3, and 29 to the third listening interval. Each of these conducting cams or sectors will operate to connect the receiving circuit 19 with the transducer 1 and the circuit to the corresponding indicators 30 and 31 will be completed in a manner similar to that described above through the cam disc 12 on which the sector 32 will make contact with the brush 33 and impress the output of the receiver over the line 34 to the indicator 30 through the brush 35 and the conducting ring 36 to which the indicator 30 is connected by means of the wire 37. The segment 38 on the disc 12 and the brush 39 act in a similar capacity to the other corresponding elements on the disc 12 for supplying power over the line 40 to the indicator 31. In this way according to the cam arrangements a signal will be sent out by the transducer 1 through the first half of the revolution. A period of silence will then follow until the transducer comes into initial position when the receiving interval begins. Three successive receiving periods are indicated in the system after which a signal is again transmitted.

It will be appreciated, of course, that the listening sector can be increased to an angle greater than 180° by increasing the length of the receiving sectors on the cam 11 and increasing the cam sectors on the disc 12 connecting to the indicators on the disc 25. It will also be seen that the sending period can also be made greater than 180°, if desired, by increasing the length of the cam segment 13. It should also be noted that the chief element in listening in the present method in order to avoid covering the entire area in the listening range is to make the interval of repetition of the signal short enough so that the second sweep over the listening range will overlap the area of the previous sweep. The interval given in the example in the present case of two seconds may be shortened or lengthened if desired. In fact, the system may be worked out so that the signal is sent out alternately after each receiving cycle. In such a case the sending intervals may be at periods of every second and the receiving intervals will then also be in the same periods. If this is done, the beam may be narrowed considerably since, considering a maximum rate of approach between two vessels as 100 feet per second, the width of the listening band between the lines C and D of Fig. 3 would only have to be 100 feet or 33 yards, which corresponds to a beam angle between the lines OP and OP₁ of approximately 10°.

Having now described my invention, I claim:

1. In a system of the type described, in combination, a sound projector and receiver unit adapted to send a beam of compressional waves and to receive compressional waves in the same direction in which the beam transmits such waves, means for rotating said unit continuously at a definite angular velocity, means for sending out a compressional wave beam signal continually during a first rotation of said unit through a chosen sector of rotation of said unit and means for switching said unit from sending to receiving during a plurality of subsequent rotations of said unit through said sector to pick up reflected waves returning from objects situated in said sector within radially spaced annular zones thereof, each of predetermined radial depth, an indicator adapted to be operated by said receiving means, said indicator having a plurality of independent indicators for identifying the echo received from any object situated in any of said annular zones within said sector, and switch means arranged to connect a different separate one of said independent indicators to said receiver during each of said subsequent rotations of said unit, whereby both direction and distance in approximate range may be determined.

2. In locating equipment, directional transmitting and receiving means for transmitting energy toward and receiving echoes from remote objects, means for varying the directions of the transmitting and receiving means in following relation with the receiving means lagging behind the transmitting means at an angle which provides a sector between the transmitting and receiving sensitivity patterns wherein neither pattern is present and is effective to position the receiving means to receive reflected echoes from objects within a predetermined radial range zone, and means utilizing the extent of the lag interval between transmitting and receiving to determine the range of remote objects within said zone.

3. In locating equipment, directional transmitting and receiving means for transmitting energy toward and receiving echoes from remote objects, means for varying the directions of the transmitting and receiving means in following relation at substantially the same rate of speed with the receiving means lagging behind the transmitting means at an angle which provides a sector between the transmitting and receiving sensitivity patterns wherein neither pattern is present and is effective to position the receiving means to receive reflected echoes from objects within a predetermined radial range zone, and means utilizing the extent of the lag interval between transmitting and receiving to determine the range of remote objects within said zone.

4. A method of sound ranging in annular sectors of given radial depths which consists in rotating a beam of compressional waves through the sector being searched at a definite rate, rotating a receiver having a directive beam of sensitivity through the same sector at the same rate after a definite time interval of sufficient extent to separate said beams with a region in which neither the beam of compressional waves nor the receiver beam of sensitivity is present to pick up reflected waves from an object situated in said sector, receiving the echoes of the compressional wave beam with the directive receiver and thereby determining the direction of the reflecting object, and employing the extent of said definite time interval to determine the distance of said reflecting object.

5. A method of sound ranging in annular sectors of given radial depths which consists in rotating a beam of compressional waves through the sector being searched at a definite rate, rotating a receiver having a directive beam of sensitivity through the same sector at the same rate after a definite time interval of sufficient extent to separate said beams with a region in which neither the beam of compressional waves nor the receiver beam of sensitivity is present to pick up reflected waves from an object situated in said sector, receiving the echoes of the compressional wave beam with the directive receiver, and employing the extent of said definite time interval to determine the distance of said reflecting object.

6. A method of sound ranging in annular sectors of given radial depths which consists in rotating a beam of compressional waves through the sector being searched at a definite rate, rotating a receiver having a directive beam of sensitivity through the same sector at the same rate after a definite time interval of sufficient extent to separate said beams with a region in which neither the beam of compressional waves nor the receiver beam of sensitivity is present to pick up reflected waves from an object situated in said sector, receiving the echoes of the compressional wave beam with the directive receiver and thereby determining the direction and approximate distance of the reflecting object.

EDWARD W. SMITH.

REFERENCES CITED

The following references are of record in the file of this patent:

UNITED STATES PATENTS

| Number | Name | Date |
| --- | --- | --- |
| 1,149,122 | Fuller | Aug. 3, 1915 |
| 1,972,889 | Hayes | Sept. 11, 1934 |
| 1,973,673 | Rice | Sept. 11, 1934 |
| 2,098,287 | Gent | Nov. 9, 1937 |
| 2,231,929 | Lyman | Feb. 18, 1941 |
| 2,410,066 | Harrison | Oct. 29, 1946 |